(12) United States Patent
Bae et al.

(10) Patent No.: US 10,700,895 B2
(45) Date of Patent: Jun. 30, 2020

(54) ROLL-OFF PERIOD DETECTING METHOD, SYMBOL STARTING POINT DETECTING METHOD, FRACTIONAL FREQUENCY OFFSET ESTIMATING METHOD, AND OFDM DOWNSTREAM SYSTEM THEREOF

(71) Applicant: Electronics and Telecommunications Research Institute, Daejeon (KR)

(72) Inventors: Jae Hwui Bae, Daejeon (KR); Jin Hyuk Song, Daejeon (KR); Je Won Lee, Daejeon (KR); Joon Young Jung, Daejeon (KR); Dong Joon Choi, Daejeon (KR); Nam Ho Hur, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 15/864,733

(22) Filed: Jan. 8, 2018

(65) Prior Publication Data

US 2018/0287823 A1 Oct. 4, 2018

(30) Foreign Application Priority Data

Apr. 3, 2017 (KR) .......... 10-2017-0042974

(51) Int. Cl.
*H04L 25/02* (2006.01)
*H04L 27/26* (2006.01)

(52) U.S. Cl.
CPC .......... *H04L 25/022* (2013.01); *H04L 27/266* (2013.01); *H04L 27/2662* (2013.01);
(Continued)

(58) Field of Classification Search
CPC .............. H04L 25/022; H04L 27/2662; H04L 27/2678; H04L 27/2695; H04L 27/2666; H04L 27/266
See application file for complete search history.

(56) References Cited

U.S. PATENT DOCUMENTS 6,567,374 B1* 5/2003 Bohnke .............. H04L 5/023
                                                370/203
6,992,972 B2* 1/2006 Van Nee ........... H04L 1/0002
                                                370/208
(Continued)

FOREIGN PATENT DOCUMENTS

KR    10-0884381 B1    2/2009
KR    10-1141062 B1    7/2012
(Continued)

OTHER PUBLICATIONS

Bae, JaeHwui, et al., "Research on Roll-Off Period Detection in DOCSIS 3.1 Downstream", *Electronics and Telecommunications Research Institute*, Jan. 19, 2017 (20 pages in English and 6 pages in Korean).

*Primary Examiner* — Hoang-Chuong Q Vu
(74) *Attorney, Agent, or Firm* — NSIP Law

(57) ABSTRACT

Disclosed are a roll-off period detection method, a symbol starting point detection method, a fractional frequency offset estimating method, and an OFDM downstream system using the same. A method of detecting a roll-off period in an OFDM downstream system according to an embodiment of the present disclosure may include: generating a temporary roll-off period by applying a windowing function to a signal having a preset length; and detecting a roll-off period based on any one of a cross correlation and a sum of differences between a detection target signal included in a range of two OFDM symbol signals based on a detection starting point, and the temporary roll-off period.

18 Claims, 9 Drawing Sheets

(52) U.S. Cl.
CPC ...... *H04L 27/2666* (2013.01); *H04L 27/2678* (2013.01); *H04L 27/2695* (2013.01)

(56) References Cited

U.S. PATENT DOCUMENTS

| | | | |
|---|---|---|---|
| 8,964,872 B2 | 2/2015 | Bae et al. | |
| 2008/0002645 A1* | 1/2008 | Seki | H04L 25/03834 |
| | | | 370/338 |
| 2011/0134773 A1 | 6/2011 | Kim | |
| 2011/0267956 A1* | 11/2011 | Yonge, III | H04L 12/413 |
| | | | 370/241 |
| 2013/0279610 A1* | 10/2013 | Schwager | H04B 3/542 |
| | | | 375/257 |
| 2013/0315339 A1* | 11/2013 | Robert | H04L 25/03343 |
| | | | 375/267 |
| 2015/0103809 A1* | 4/2015 | Karimi | H04W 52/246 |
| | | | 370/336 |
| 2015/0172088 A1* | 6/2015 | Arambepola | H04L 27/2646 |
| | | | 375/296 |
| 2015/0381468 A1* | 12/2015 | Murphy | H04L 43/50 |
| | | | 375/227 |
| 2016/0182266 A1* | 6/2016 | Gaal | H04L 27/2042 |
| | | | 375/219 |

FOREIGN PATENT DOCUMENTS

| | | |
|---|---|---|
| KR | 10-1599074 B1 | 3/2016 |
| KR | 10-2016-0084759 A | 7/2016 |
| KR | 10-1637940 B1 | 7/2016 |

* cited by examiner

ROLL-OFF PERIOD DETECTING METHOD, SYMBOL STARTING POINT DETECTING METHOD, FRACTIONAL FREQUENCY OFFSET ESTIMATING METHOD, AND OFDM DOWNSTREAM SYSTEM THEREOF

CROSS REFERENCE TO RELATED APPLICATION

The present application claims priority to Korean Patent Application No. 10-2017-0042974, filed Apr. 3, 2017, the entire contents of which is incorporated herein for all purposes by this reference.

BACKGROUND OF THE INVENTION

Field of the Invention

The present disclosure relates generally to a roll-off period detecting method, a symbol starting point detecting method, a fractional frequency offset estimating method, and an orthogonal frequency division multiplex (OFDM) downstream system using the same. More particularly, the present disclosure relates to a method of detecting roll-off period, and detecting an OFDM symbol starting point and estimating a fractional frequency offset by using the detected roll-off period in a data over cable service specification 3.1 (DOCSIS 3.1) downstream system.

Description of the Related Art

The DOCSIS 3.1 standard has been developed for transmitting up to 10 Gbps within a cable broadcasting network. In a DOCSIS 3.1 downstream system, a roll-off period (RP) is added to an OFDM symbol by using windowing that sharpens spectrum edges of an OFDM signal to maximize a channel capacity.

Meanwhile, in order to reconstruct a received DOCSIS 3.1 downstream signal, a starting point of an OFDM symbol is detected. In addition, a fractional frequency offset is detected and compensated. The fractional frequency offset may be simultaneously estimated when detecting a starting point of an OFDM symbol when a method of using a guard period signal is used.

However, roll-off period signals present at left and right sides of an OFDM symbol may be signals different from each other since signals of OFDM symbols which are backwardly and forwardly adjacent are added according to a windowing function, and are present within the roll-off period. In other words, within a guard period of an arbitrary OFDM symbol, a signal of a previous OFDM symbol is included as long as a roll-off period length. Accordingly, when the guard period including the roll-off period is applied to a method of detecting a starting point of an OFDM symbol and estimating a fractional frequency offset, an estimation error becomes large.

Accordingly, in order to remove an effect of a roll-off period, a method of detecting a roll-off period in a DOCSIS 3.1 downstream system is required.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to provide a roll-off period detecting method and a downstream system the same wherein the method detects a roll-off period included in a DOCSIS 3.1 downstream system.

Another object of the present disclosure is to provide a starting point detecting method and a downstream system using the same wherein the method detects an OFDM symbol starting point by using the detected roll-off period.

Still another object of the present disclosure is to provide a fractional frequency offset estimating method and a downstream system using the same wherein the method estimates a fractional frequency offset by using the detected roll-off period.

Technical objects obtainable from the present disclosure are not limited by the above-mentioned technical object, and other unmentioned technical objects can be clearly understood from the following description by those having ordinary skill in the technical field to which the present disclosure pertains In order to achieve the above object, according to one aspect of the present disclosure, there is provided a method of detecting a roll-off period in an OFDM downstream system. The roll-off period detecting method may include: generating a temporary roll-off period by applying a windowing function to a signal having a preset length; and detecting a roll-off period based on any one of a cross correlation and a sum of differences between a detection target signal included in a range of two OFDM symbol signals based on a detection starting point, and the temporary roll-off period.

Herein, the detection target signal may be the signal having the preset length and which is selected by moving along a time axis in the two OFDM symbol signals.

Meanwhile, in the detecting of the roll-off period, a position of a detection target signal in which a cross correlation between the detection target signal and the temporary roll-off period becomes maximum may be detected as a position of the roll-off period.

Meanwhile, in the detecting of the roll-off period, a position of a detection target signal in which a sum of differences between the detection target signal and the temporary roll-off period becomes minimum may be detected as a position of the roll-off period.

Meanwhile, in the generating of the temporary roll-off period, the temporary roll-off period may be generated by using a signal included in an OFDM symbol signal before the detection starting point and an OFDM symbol signal after the detection starting point.

Meanwhile, the preset length of the roll-off period may be any one of 0, 64, 128, 192, and 256.

According to another aspect of the present disclosure, there is provided a method of detecting a symbol starting point in an OFDM downstream system. The symbol starting point detecting method may include: generating a temporary roll-off period by applying a windowing function to a signal having a preset length; detecting a roll-off period based on any one of a cross correlation and a sum of differences between a detection target signal included in a range of two OFDM symbol signals based on a detection starting point, and the temporary roll-off period; and detecting an OFDM symbol starting point based on a position of the detected roll-off period.

Herein, in the detecting of the OFDM symbol starting point, the OFDM symbol starting point may be detected by using a residual guard period obtained by removing the detected roll-off period from a guard period.

According to another aspect of the present disclosure, there is provided a method of estimating a fractional frequency offset in an OFDM downstream system. The fractional frequency offset method estimating may include: generating a temporary roll-off period by applying a windowing function to a signal having a preset length; detecting a roll-off period based on any one of a cross correlation and a sum of differences between a detection target signal included in a range of two OFDM symbol signals based on a detection starting point, and the temporary roll-off period; and estimating a fractional frequency offset by using a residual guard period obtained by removing the detected roll-off period from a guard period.

According to another aspect of the present disclosure, there is provided an OFDM downstream system. The OFDM downstream system may include: a temporary roll-off period generating unit generating a temporary roll-off period by applying a windowing function to a signal having a preset length; and a roll-off period detecting unit detecting a roll-off period based on any one of a cross correlation and a sum of differences between a detection target signal included in a range of two OFDM symbol signals based on a detection starting point, and the temporary roll-off period.

Herein, the detection target signal may be the signal having the preset length selected by moving along a time axis in the two OFDM symbol signals.

Meanwhile, the roll-off period detecting unit may detect as a position of the roll-off period a position of a detection target signal in which a cross correlation between the detection target signal and the temporary roll-off period becomes maximum.

Meanwhile, the roll-off period detecting unit may detect as a position of the roll-off period a position of a detection target signal in which a sum of differences between the detection target signal and the temporary roll-off period becomes minimum.

Meanwhile, the temporary roll-off period generating unit my generate the temporary roll-off period by using an OFDM symbol signal before the detection starting point and an OFDM symbol signal after the detection starting point.

Meanwhile, the preset length may be any one of 0, 64, 128, 192, and 256.

Meanwhile, the OFDM downstream system may further include a symbol starting point detecting unit detecting an OFDM symbol starting point based on a position of the detected roll-off period.

Herein, the symbol starting point detecting unit may detect the OFDM symbol starting point by using a residual guard period obtained by removing the detected roll-off period from a guard period.

Meanwhile, the OFDM downstream system may further include a fractional frequency offset estimating unit estimating a fractional frequency offset by using the residual guard period obtained by removing the detected roll-off period from a guard period.

The above briefly summarized features of the present disclosure are merely illustrative aspects of the detailed description of the present disclosure that will be described later and do not limit the scope of the present disclosure.

According to the present disclosure, a roll-off period included in a DOCSIS 3.1 downstream signal is detected, and a fractional frequency offset is estimated by using a residual guard period signal obtained by removing the detected roll-off period from a guard period signal. Accordingly, an accurate fractional frequency offset may be estimated.

In addition, according to the present disclosure, an OFDM symbol starting point is detected by using the detected roll-off period, thus performance of OFDM symbol synchronization may be improved.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings. That is, unintended effects according to implementation of the present disclosure can also be derived by those skilled in the art from embodiments of the present disclosure.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
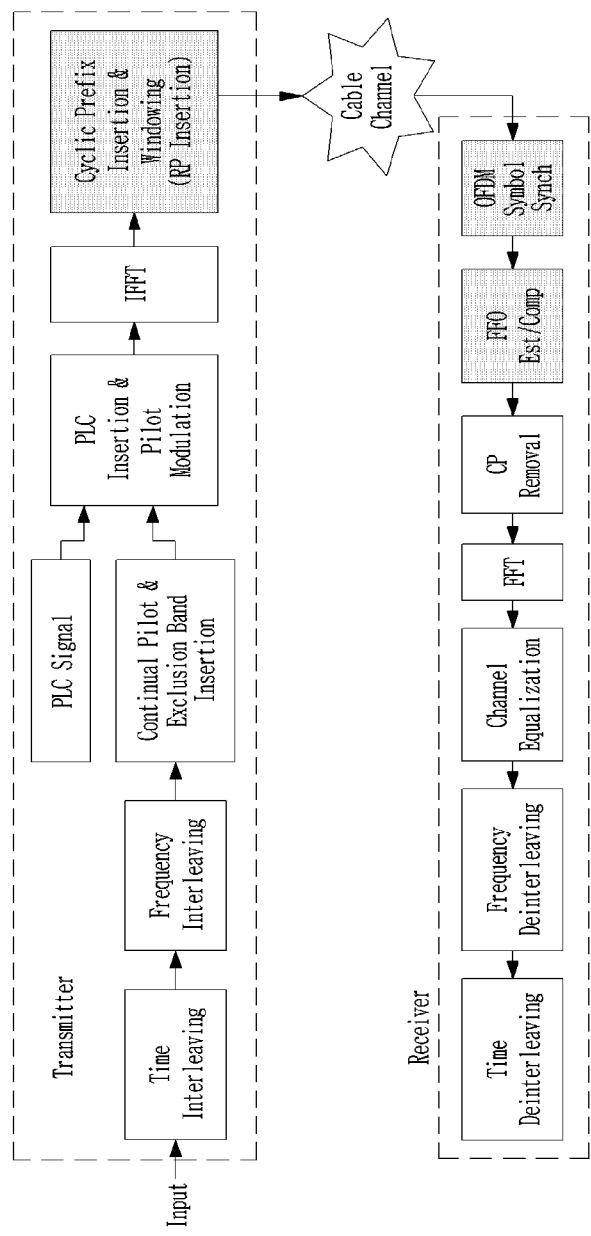
FIG. 1 is a block diagram showing a system for transmitting and receiving a DOCSIS 3.1 downstream signal according to an embodiment of the present disclosure.

Hereinafter, with reference to drawings, embodiments of the present disclosure are described in detail in a manner that one of ordinary skill in the art may perform the embodiments without undue difficulty. However, as those skilled in the art would realize, the described embodiments may be modified in various different ways, all without departing from the spirit or scope of the present disclosure.

To avoid obscuring the subject matter of the present disclosure, while embodiments of the present disclosure are illustrated, well known functions or configurations will be omitted from the following descriptions. The drawings and description are to be regarded as illustrative in nature and not restrictive. Like reference numerals designate like elements throughout the specification.

In the present disclosure, when an element is mentioned to be "coupled" or "connected" to another element, this may mean that it is directly coupled or connected to the other element, but it is to be understood that yet another element may exist in-between. In addition, it will be understood that the terms "comprises", "comprising", "includes", "including" when used in this specification, specify the presence of one or more other components, but do not preclude the presence or addition of one or more other components unless defined to the contrary.

In the present disclosure, the terms first, second, etc. are used only for the purpose of distinguishing one element from another, and do not limit the order or importance, etc., between elements unless specifically mentioned. Therefore, within the scope of the present disclosure, a first component of an embodiment may be referred to as a second component in another embodiment, or similarly, a second component may be referred to as a first component.

In the present disclosure, the components that are distinguished from each other are intended to clearly illustrate each feature and do not necessarily mean that components are separate. In other words, a plurality of components may be integrated into one hardware or software unit or one component may be distributed into a plurality of hardware or software units. Thus, unless otherwise noted, such integrated or distributed embodiments are also included within the scope of the present disclosure In the present disclosure, the components described in the various embodiments are not necessarily essential components, and some may be optional components. Thus, embodiments including a subset of the components described in one embodiment are also included within the scope of this disclosure. Also, embodiments that include other elements in addition to those described in the various embodiments are also included within the scope of the present disclosure.

Hereinafter, with reference to drawings, embodiments of the present disclosure are described.

FIG. 1 is a block diagram showing a system for transmitting and receiving a DOCSIS 3.1 downstream signal according to an embodiment of the present disclosure.

Referring to FIG. 1, in order to maximize a channel capacity, windowing that sharpens spectrum edges of an OFDM signal may be applied to a time domain signal obtained after an IFFT (Inverse Fast Fourier Transform) process in an OFDM modulation so that a roll-off period (RP) may be added to an OFDM symbol.

Figure 2:
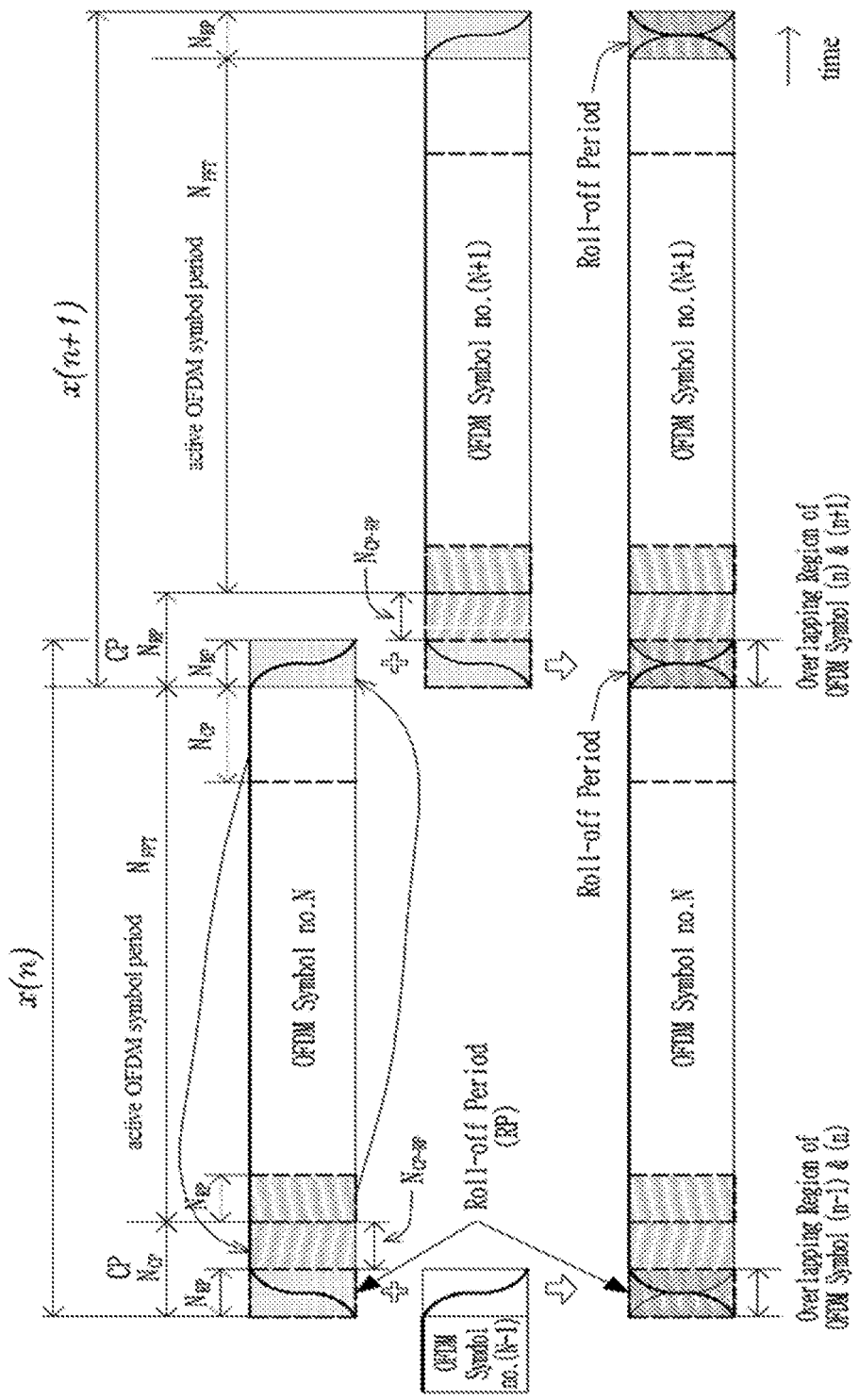
FIG. 2 is a view for illustrating a process of generating a roll-off period signal by performing windowing for a DOCSIS 3.1 downstream signal according to an embodiment of the present disclosure.

FIG. 2 is a view for illustrating of a process of generating a roll-off period signal by performing a windowing process for a DOCSIS 3.1 downstream signal according to an embodiment of the present disclosure.

Referring to FIG. 2, a time domain active OFDM symbol may have a length being $N_{FFT}$.

A guard period (Cyclic Prefix, CP) is a signal attached to a front portion of an OFDM symbol on a time axis, and the attached signal is a $N_{CP}$ number of signals that are copied from an end portion of an active OFDM symbol length signal.

In addition, a roll-off period (RP) may be generated by copying $N_{RP}$ signals from a front portion on a time axis of an active OFDM symbol length signal, applying a windowing function to the copied signal, and attaching the copied signal to which the windowing function is applied to the end portion of the OFDM symbol. Windowing refers to tapering spectrum edges by applying a raised cosine function to a sample within the roll-off period. Particularly, in time domain received OFDM signals of a DOCSIS 3.1 downstream system, OFDM symbol signals may be present by overlapping in a roll-off period between neighboring OFDM symbols.

When edges of OFDM symbols are attenuated in a tapering form in a time domain by applying windowing, spectrum edges become sharpened in a frequency domain, thus more active OFDM subcarriers may be transmitted within an identical frequency bandwidth. However, when spectrum edges become sharpened in a frequency domain, a length of an OFDM symbol in a time domain becomes long, thus a channel capacity decreases. Therefore, an optimum value is present between a channel capacity and sharpening spectrum edges in a frequency domain.

In a DOCSIS 3.1 downstream signal, times and a number of samples of a windowing RP to which spectrum edge tapering is applied is as Table 1 below.

TABLE 1

| Time of roll-off period (µs) | Number of roll-off period samples ($N_{RP}$) |
|---|---|
| 0 | 0 |
| 0.3125 | 64 |
| 0.625 | 128 |
| 0.9375 | 192 |
| 1.25 | 256 |

In a DOCSIS 3.1 downstream system, a cyclic prefix (CP) is applied as a guard period to remove OFDM inter symbol interference generated by micro-reflection having a time delay in a micro second unit and which is present in a received channel. Accordingly, micro-reflection having a time delay shorter than a guard period $T_{CP}$ does not cause interference between OFDM symbols.

Times and number of guard period (CP) samples used in a DOCSIS 3.1 downstream signal are as Table 2 below.

TABLE 2

| Time of cyclic prefix (µs) | Number of cyclic prefix samples ($N_{CP}$) |
|---|---|
| 0.9375 | 192 |
| 1.25 | 256 |
| 2.5 | 512 |
| 3.75 | 768 |
| 5.0 | 1024 |

In addition, a relationship between a roll-off period length and a guard period length which are used in a DOCSIS 3.1 downstream signal is as Formula 1 below. In other words, a roll-off period length ($RP_{Lengthh}$) may not be larger than a guard period length ($CP_{Length}$).

$$RP_{Lengthh} \leq CP_{Length} \quad \text{[Formula 1]}$$

Figure 3:
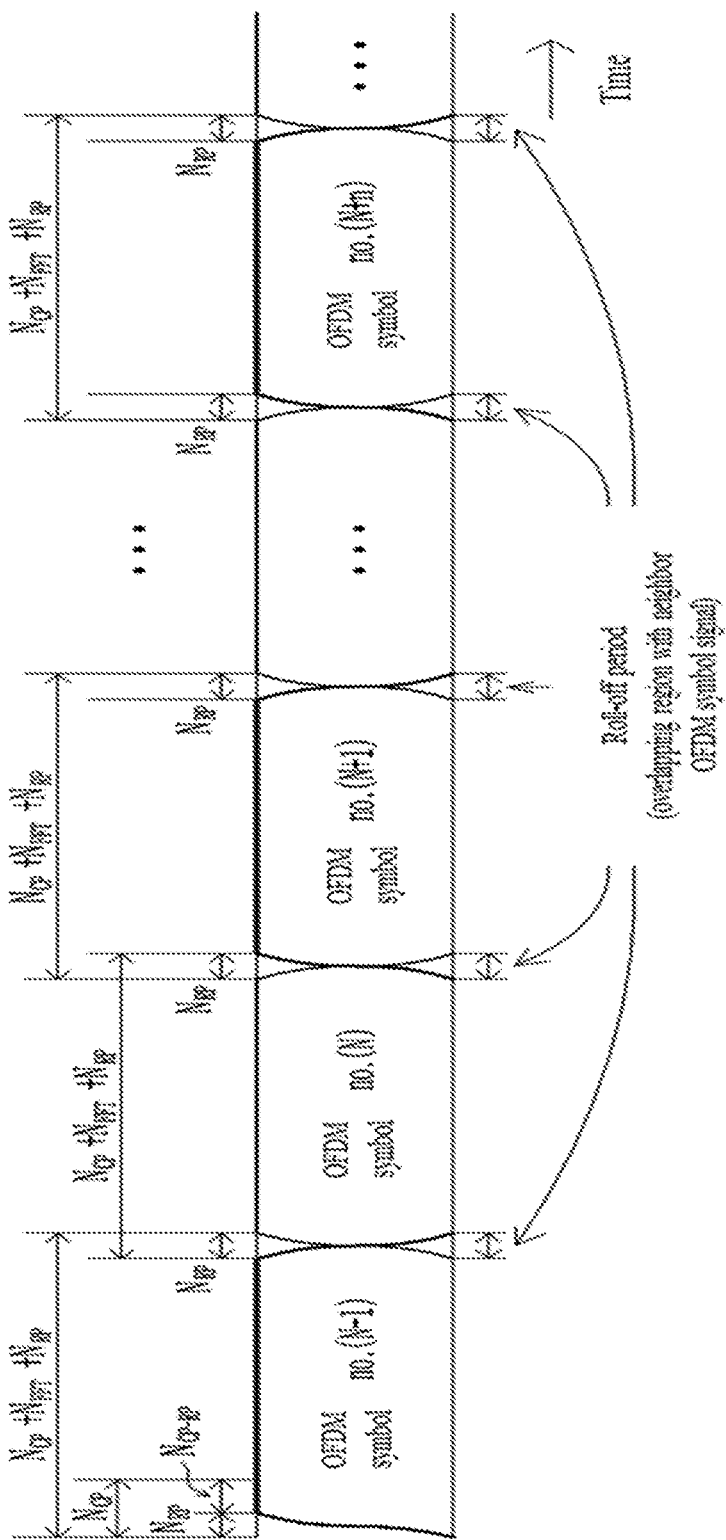
FIG. 3 is a view showing a configuration of an OFDM time domain symbol of a received DOCSIS 3.1 downstream signal according to an embodiment of the present disclosure.

FIG. 3 is a view showing a configuration of a time domain OFDM symbol of a received DOCSIS 3.1 downstream signal according to an embodiment of the present disclosure.

Referring to FIG. 3, as shown in FIG. 2, a roll-off period may be present, the roll-off period is added to an end portion of each OFDM symbol by copying a front part of each OFDM symbol. In a roll-off period, a signal that is added to two neighbor OFDM signals according to a windowing function that is applied in a DOCSIS 3.1 downstream system may be present.

Accordingly, as shown in FIG. 3, in a received DOCSIS 3.1 downstream signal, a roll-off period may be present at an end part of each OFDM symbol. Each roll-off period becomes an "overlapping region with a neighbor OFDM symbol signal" which is added to a present OFDM symbol signal and to a next OFDM symbol signal according to a windowing function.

Meanwhile, in order to reconstruct a received DOCSIS 3.1 downstream signal, first, an OFDM symbol synchronization that determines a starting point of an OFDM symbol is detected.

An object of an OFDM symbol synchronization is to estimate a transmission mode of 4K-FFT (Fast Fourier transform) or 8K-FFT, to estimate a guard period length applied to a received signal among guard period lengths $N_{CP}$=192, 256, 512, 768, and 102, and to estimate an approximated FFT windowing starting point. Since a DOCSIS 3.1 downstream signal does not include an additional preamble signal that transmits an OFDM modulation parameter such as guard period length, roll-off period length, etc., an OFDM modulation parameter is detected in a received signal by using a blind method.

Hereinafter, according to an embodiment of the present disclosure, a method of detecting a guard period signal, and a roll-off period signal using a blind method will be described.

Detecting a Guard Period Signal

According to an embodiment of the present disclosure, an example of a method of detecting a length and a position of a guard period using a blind method will be described. Herein, detecting a length and a position of a guard period may be performed for a received time domain DOCSIS 3.1 downstream signal.

(1) A length of a single time domain OFDM symbol of a DOCSIS 3.1 downstream signal may be the sum ($N_{CP}$+$N_{FFT}$) of a guard period length and an active symbol period length as shown in FIG. 3. Herein, $N_{CP}$ is a number of CP samples used in a DOCSIS 3.1 downstream system, and may be any one of 192, 256, 512, 768, and 1024.

(2) In order to detect a guard period, a signal having a length corresponding to a length of two time domain OFDM symbols, 2×($N_{CP}$+$N_{FFT}$), is stored.

(3) At least one complete time domain OFDM symbol having a length being ($N_{CP}$+$N_{FFT}$) is present in the above signal. A length and a position of a guard period may be detected from a received signal of two time domain OFDM symbols.

(4) A guard period may be detected based on any one of a cross correlation and a sum of differences between a signal of an arbitrary position and a signal that is delayed by an active symbol period $N_{FFT}$ from the arbitrary positional signal in a received signal having a length of two OFDM symbols.

In detail, a position where a cross correlation between a signal of an arbitrary position and a signal that is delayed by an active symbol period $N_{FFT}$ from the arbitrary positional signal becomes maximum may be detected as a position of a guard period.

In addition, a position where a sum of differences between a signal of an arbitrary position and a signal that is delayed by an active symbol period $N_{FFT}$ from the arbitrary positional signal becomes minimum may be detected as a position of a guard period.

Meanwhile, a guard period length may be determined from $N_{CP}$=192, 256, 512, 768, and 1024. The above five lengths of a guard period may be respectively applied to the above method of detecting the guard period, and a length of the guard period which has the best result may be determined as a length of a guard period which is applied to a received signal.

Detecting a Roll-Off Period Signal

Figure 4:
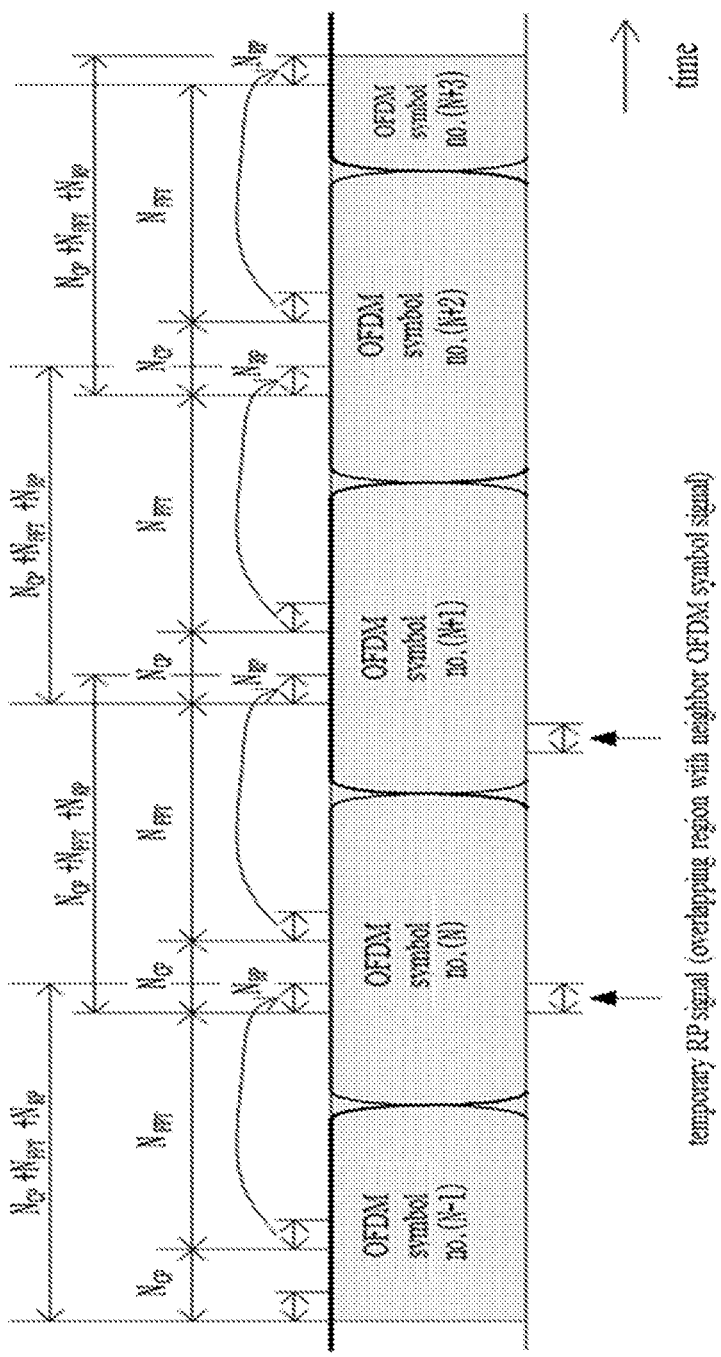
FIG. 4 is a view for illustrating a process of generating a temporary roll-off period according to an embodiment of the present disclosure.
Figure 5:
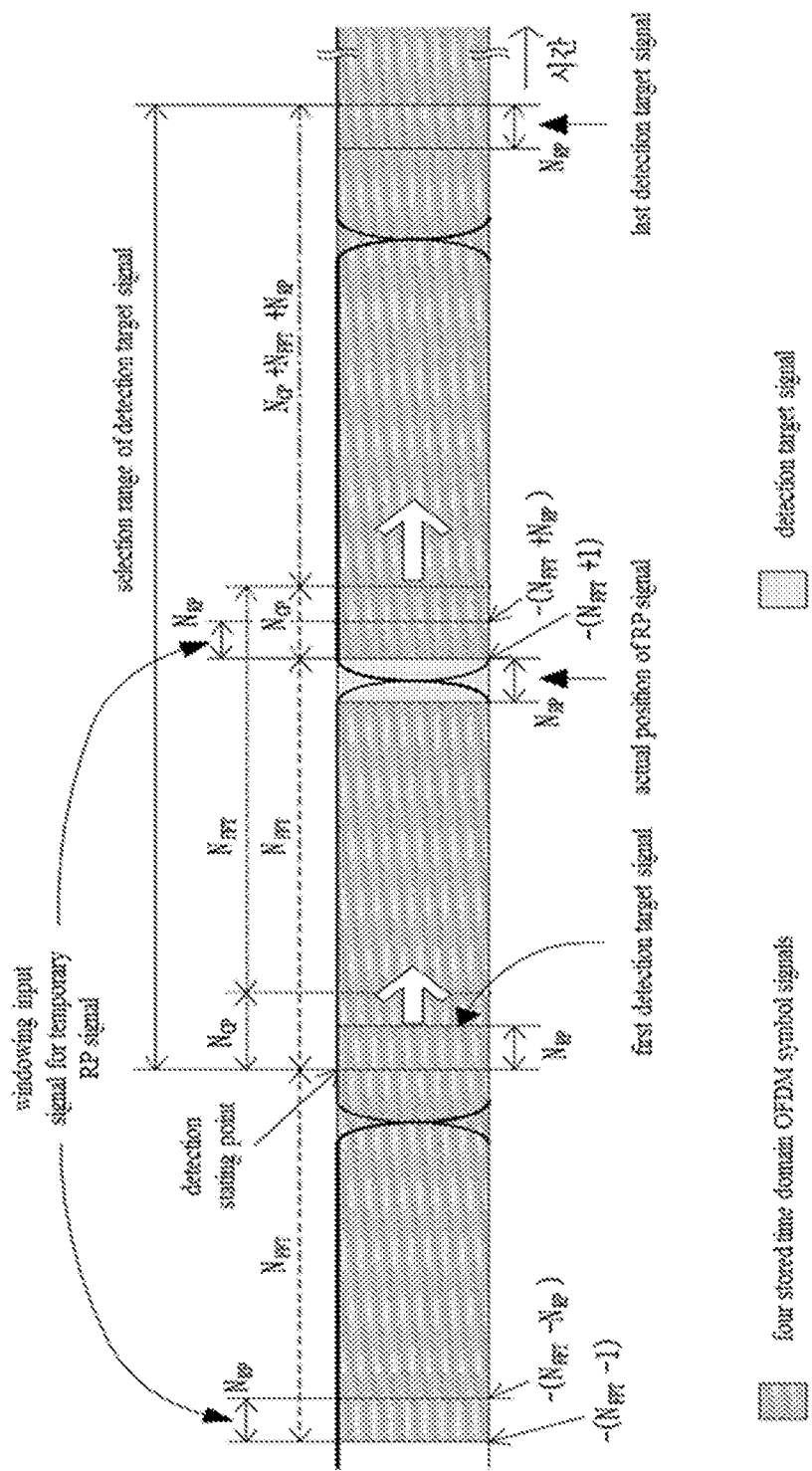
FIG. 5 is a view for illustrating of selecting a detection target signal and a range thereof according to an embodiment of the present disclosure.

According to an embodiment of the present disclosure, a method of detecting a roll-off period signal using a blind method will be descried with reference to FIG. 4 and FIG. 5. FIG. 4 is a view for illustrating a method of generating a temporary roll-off period according to an embodiment of the present disclosure, and FIG. 5 is a view for illustrating four time domain OFDM symbol signals and a detection range for detecting a roll-off period according to an embodiment of the present disclosure.

(1) Referring to FIG. 4, in order to detect a roll-off period, a signal having a length of four OFDM symbols, that is, at least 4×($N_{CP}$+$N_{FFT}$+$N_{RP}$), is required from a received signal. In addition to two OFDM symbols required when detecting a guard period, two time domain OFDM symbols are required for generating a temporary RP signal using a windowing process. A temporary RP signal is generated by using signals of an $N^{th}$ current OFDM symbol and a previous $(N-1)^{th}$ OFDM symbol. By using the generated temporary RP signal, a RP signal may be detected in a range of two time domain OFDM signals having a length of 2×($N_{CP}$+$N_{FFT}$+$N_{RP}$), and which is present in a middle of four OFDM symbols.

(2) For data having a length of four time domain OFDM symbols, a detection starting point begins from data at ($N_{CP}$+$N_{FFT}$) that is an end part of a single time domain OFDM symbol length.

(3) In a method of detecting a RP signal using a blind method, a temporary RP signal may be generated by applying a windowing process applied in a DOCSIS 3.1 downstream signal transmitter, and a RP signal may be detected by using the temporary RP signal and a cross correlation and a subtraction operation.

(4) Referring to FIG. 5, based on a detection starting point, a temporary RP signal may be generated by applying windowing used in a DOCSIS 3.1 downstream system to a signal having a $N_{RP}$ length being a range $[-(N_{FFT}-1)\sim-(N_{FFT}-N_{RP})]$, and a signal having a $N_{RP}$ length being a range of $[(N_{FFT}+1)\sim(N_{FFT}+N_{RP})]$. Herein, the $N_{RP}$ length (or a length of a roll-off period) may be determined from among 0, 64, 128, 192, and 256. The above five lengths may be respectively applied to the above method of detecting the RP, and a RP length having the best result may be determined as a RP length that is applied to a received signal.

(5) A method of detecting a RP position using a correlation selects a detection target signal which will select a length correlation identical to a temporary RP signal from a signal having a length of two time domain OFDM symbols based on a detection starting point. Herein, as shown in FIG. 5, the detection target signal having a $N_{RP}$ length may be selected by moving along a time axis within a range of two time domain OFDM symbol signals where a RP will be detected. In addition, a position of a detection target signal in which a correlation value becomes the maximum by performing cross correlation between the temporary RP signal and the detection target signal may be determined as a position of the RP signal.

(6) In a method of detecting a RP position using a subtraction operation, a method of selecting a detection target signal is identical to the method of detecting the RP position using the correlation. The method using the subtraction operation calculates a difference for each sample between the temporary RP signal and the detection target signal. A length $N_{RP}$ of a temporary RP signal which has the minimum value when adding all difference values between $N_{RP}$ samples may be determined as a length of a RP included in the received signal, and a position of the detection target signal may be determined as a position of the RP.

Hereinafter, a method of detecting an OFDM symbol starting point and a method of estimating a fractional frequency offset which use the above detected guard period and roll-off period will be described.

Method of Detecting an OFDM Symbol Starting Point

First, an approximated OFDM symbol starting point may be detected based on a length and a position of a guard period which are detected according to an embodiment of the present disclosure.

Then, a temporary roll-off period signal is generated nearby the guard period position detected according to an embodiment of the present disclosure. A length and a position of a roll-off period signal may be detected by using the generated temporary roll-off period signal. Accordingly, an accurate OFDM symbol starting point may be detected based on the position of the roll-off period signal.

Herein, when a roll-off period signal is present, within a guard period, a previous OFDM symbol signal and a guard period signal of a current OFDM symbol are added as long as the roll-off period length, thus the guard period of the current OFDM symbol becomes different from a guard period length signal that is after an active OFDM symbol by roll-off period length.

Accordingly, when detecting a starting point of an OFDM symbol using a guard period, a roll-off period signal works as noise within the guard period, thus performance is degraded when the roll-off period signal is present rather than when the roll-off period signal is not present.

In order to overcome the above problem, an approximated starting point of an OFDM symbol may be detected by using a guard period signal including a roll-off period signal, and then, an accurate starting point of the OFDM symbol may be detected by detecting a length and a position of the roll-off period signal by using a temporary roll-off period signal Method of Estimating a Fractional Frequency Offset Since a guard period signal and a number of $N_{CP}$ signals of an end part of an active OFDM symbol are identical, when a complex conjugated multiplication of two signals is calculated, imaginary parts of complex numbers become 0. However, when a fractional frequency offset is present, the imaginary parts have complex values rather than becoming 0. A phase corresponding to the above complex values is a fractional frequency offset. Meanwhile, the fractional frequency offset may be estimated by using a Van de Beek algorithm.

In a DOCSIS 3.1 downstream system, a roll-off period signal is applied. Accordingly, a $N_{RP}$ number of signals of a guard period signal differs from an active OFDM symbol signal, thus a large error may be generated while estimating a fractional frequency offset by using a guard period when the guard period is applied.

Accordingly, in order to generate a $N_{CP'} = N_{CP} - N_{PP}$ number of signals in which a $N_{RP}$ number of signals corresponding to a roll-off period signal of a guard period is removed by using a roll-off period signal detected according to an embodiment of the present disclosure, or to stably remove the roll-off period signal, a number of signals which is greater than $N_{RP}$ is removed, and remaining signals are applied to estimate a fractional frequency offset. Accordingly, a guard period signal not including noise may be applied, thus a fractional frequency offset may be accurately estimated.

Figure 6:
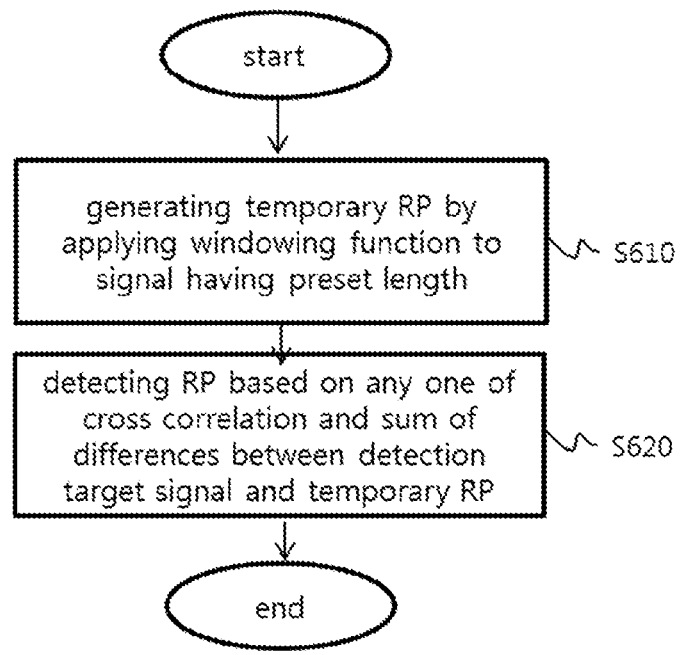
FIG. 6 is a flowchart showing a method of detecting a roll-off period according to an embodiment of the present disclosure.

FIG. 6 is a flowchart for illustrating a method of detecting a roll-off period according to an embodiment of the present disclosure.

Referring to FIG. 6, in step S610, an OFDM downstream system may generate a temporary roll-off period by applying a windowing function to a signal having a preset length.

Herein, the preset length may be any one of 0, 64, 128, 192, and 256.

Meanwhile, in step S610, the temporary roll-off period may be generated by using a signal included in an OFDM symbol signal before a detection starting point and an OFDM symbol signal after the detection starting point.

In addition, in step S620, the OFDM downstream system may detect a roll-off period based on any one of a cross correlation and a sum of differences between a detection target signal which is included in a range of two OFDM symbol signals based on the detection starting point, and the temporary roll-off period.

In detail, the OFDM downstream system may detect a position of a detection target signal in which a cross correlation between the detection target signal and the temporary roll-off period becomes maximum as a position of the roll-off period.

In addition, the OFDM downstream system may detect a position of a detection target signal in which a sum of differences between the detection target signal and the temporary roll-off period becomes minimum as a position of the roll-off period.

Herein, the detection target signal may be a signal having a preset length and which is selected by moving along a time axis within the two OFDM symbol signals.

Figure 7:
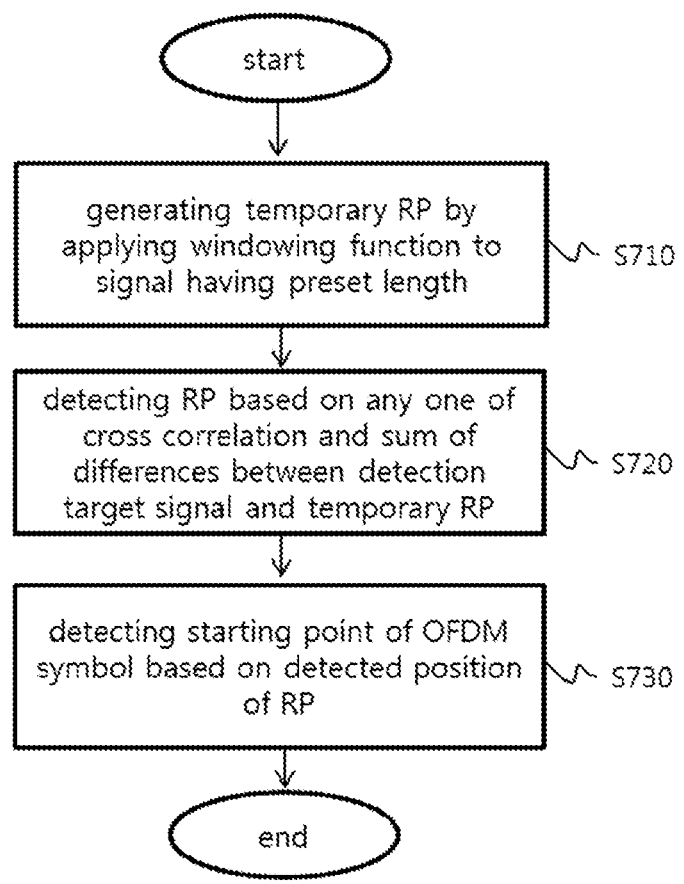
FIG. 7 is a flowchart showing a method of detecting a symbol starting point according to an embodiment of the present disclosure.

FIG. 7 is a view for illustrating a method of detecting an OFDM symbol starting point according to an embodiment of the present disclosure.

Referring to FIG. 7, in step S710, an OFDM downstream system may generate a temporary roll-off period by applying a windowing function to a signal having a preset length.

In step S720, the OFDM downstream system may detect a roll-off period based on any one of a cross correlation and a sum of differences between a detection target signal included in two OFDM symbol signals based on a detection starting point, and the temporary roll-off period.

In addition, in step S730, the OFDM downstream system may detect a starting point of an OFDM symbol based on a position of the detected roll-off period.

Meanwhile, the OFDM downstream system may detect the starting point of the OFDM symbol by using a residual guard period obtained by removing the detected roll-off period from a guard period. In detail, the OFDM downstream system may detect as a starting point of the OFDM symbol a position of a detection target signal in which a cross correlation between the detection target signal and the residual guard period becomes maximum. In addition, OFDM downstream system may detect as a starting point of the OFDM symbol a position of a detection target signal in which a sum of differences between the detection target signal and the residual guard period becomes minimum.

Figure 8:
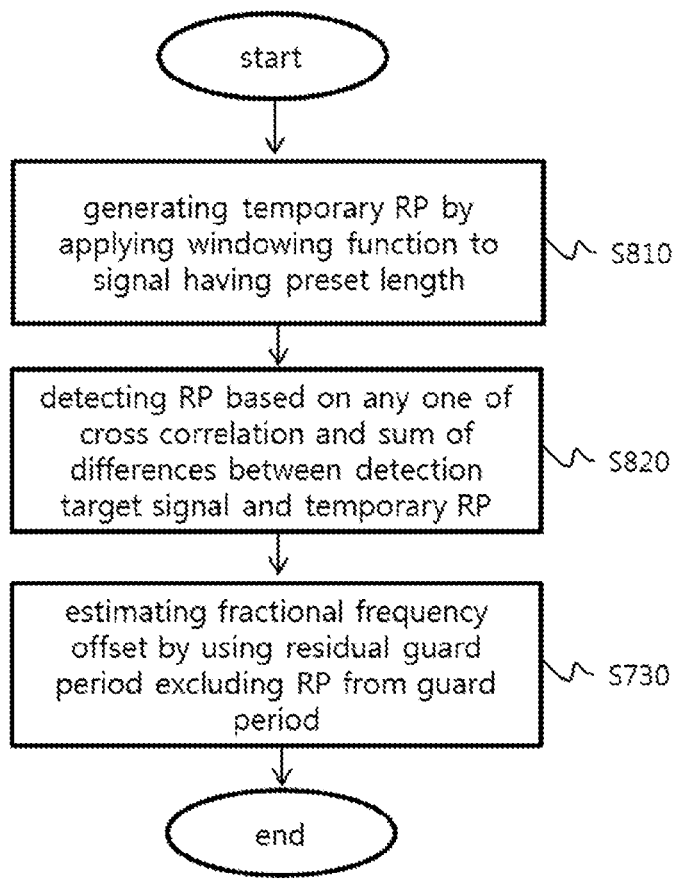
FIG. 8 is a view for illustrating a method of estimating a fractional frequency offset according to an embodiment of the present disclosure.

FIG. 8 is a view for illustrating a method of estimating a fractional frequency offset according to an embodiment of the present disclosure.

In step S810, an OFDM downstream system may generate a temporary roll-off period by applying a windowing function to a signal having a preset length.

In step S820, the OFDM downstream system may detect a roll-off period based on any one of a cross correlation and a sum of differences between a detection target signal included in a range of two OFDM symbol signals based on a detection starting point, and the temporary roll-off period.

In addition, in step S830, the OFDM downstream system may estimate a fractional frequency offset by using a residual guard period obtained by removing the detected roll-off period from a guard period.

Figure 9:
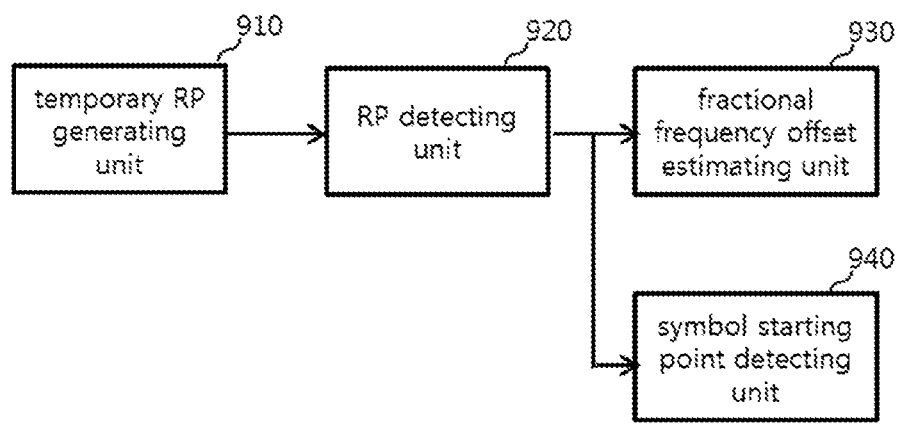
FIG. 9 is a block diagram for illustrating an OFDM downstream system according to an embodiment of the present disclosure.

FIG. 9 is a block diagram for illustrating an OFDM downstream system according to an embodiment of the present disclosure.

The OFDM downstream system may include a temporary roll-off period generating unit 910, a roll-off period detecting unit 920, a fractional frequency offset estimating unit 930, and a symbol starting point detecting unit 940.

The temporary roll-off period generating unit 910 may generate a temporary roll-off period by applying a windowing function to a signal having a preset length. Herein, the preset length may be any one of 0, 64, 128, 192, and 256.

Meanwhile, the temporary roll-off period generating unit 910 may generate the temporary roll-off period by using a signal included in an OFDM symbol signal before a detection starting point and an OFDM symbol signal after the detection starting point.

The roll-off period detecting unit 920 may detect a roll-off period based on any one of a cross correlation and a sum of differences between a detection target signal which is included in a range of two OFDM symbol signals based on the detection starting point, and the temporary roll-off period.

Herein, the detection target signal may be a signal having a preset length and which is selected by moving along the time axis in the two OFDM symbol signals Meanwhile, the roll-off period detecting unit 920 may detect as a position of the roll-off period a position of a detection target signal in which a cross correlation between the detection target signal and the temporary roll-off period becomes maximum.

In addition, the roll-off period detecting unit 920 may detect as a position of the roll-off period a position of a detection target signal in which a sum of differences between the detection target signal and the temporary roll-off period becomes minimum.

The fractional frequency offset estimating unit 930 may estimate a fractional frequency offset by using a residual guard period obtained by removing the roll-off period detected in the roll-off period detecting unit 920 from a guard period.

The symbol starting point detecting unit 940 may detect a starting point of an OFDM symbol based on the position of the roll-off period detected in the roll-off period detecting unit 920.

Meanwhile, the symbol starting point detecting unit 940 may detect a starting point of the OFDM symbol by using the residual guard period obtained by removing the roll-off period detected in the roll-off period detecting unit 920 from the guard period. In detail, the symbol starting point detecting unit 940 may detect as a starting point of the OFDM symbol a position of a detection target signal in which a cross correlation between the detection target signal and the residual guard period becomes maximum. In addition, the symbol starting point detecting unit 940 may detect as a starting point of the OFDM symbol a position of a detection target signal in which a sum of differences between the detection target signal and the residual guard period becomes the minimum.

Meanwhile, the temporary roll-off period generating unit 910, the roll-off period detecting unit 920, the fractional frequency offset estimating unit 930, and the symbol starting point detecting unit 940 which are described in FIG. 9 may be implemented in an OFDM symbol synchronization module of the OFDM downstream system.

Hereto, a method of detecting a roll-off period, a method of detecting a symbol starting point and estimating a fractional frequency offset using the detected roll-off period, and an OFDM downstream system are described with reference to FIG. 6 to FIG. 9.

According to an embodiment of the present disclosure, a roll-off period included in a DOCSIS 3.1 downstream signal is detected, and a fractional frequency offset is estimated by using a residual guard period signal obtained by removing the detected roll-off period from a guard period signal. Accordingly, an accurate fractional frequency offset may be estimated.

In addition, according to the present disclosure, a starting point of an OFDM symbol is detected by using the detected roll-off period, thus performance of OFDM symbol synchronization may be improved.

Meanwhile, according to an aspect of the present disclosure, software or a computer-readable medium including executable instructions may be provided for performing a roll-off period detection method. The roll-off period detection method may include: generating a temporary roll-off period by applying windowing to a signal having a preset length; and detecting a roll-off period based on any one of a cross correlation or a sum of differences between a detection target signal included in a range of two OFDM symbol signals based on a detection starting point, and the temporary roll-off period.

In addition, meanwhile, according to an aspect of the present disclosure, software or a computer-readable medium including executable instructions may be provided for performing a symbol starting point detection method. The symbol starting point detection method may include: generating a temporary roll-off period by applying windowing to a signal having a preset length; detecting a roll-off period based on any one of a cross correlation or a sum of differences between a detection target signal included in a range of two OFDM symbol signals based on a detection starting point, and the temporary roll-off period; and detecting a symbol starting point based on a position of the detected roll-off period In addition, meanwhile, according to an aspect of the present disclosure, software or a computer-readable medium including executable instructions may be provided for performing a fractional frequency offset estimating method. The fractional frequency offset estimating method may include: generating a temporary roll-off period by applying windowing to a signal having a preset length; detecting a roll-off period based on any one of a cross correlation or a sum of differences between a detection target signal included in a range of two OFDM symbol signals based on a detection starting point, and the temporary roll-off period; and estimating a fractional frequency offset by using a residual guard period obtained by removing the detect roll-off period from a guard period.

The method shown in the present disclosure is described as a series of operations for clarity of description, and the order of steps is not limited. When needed, the steps may be performed at the same time or in a different order. In order to implement the method according to the present disclosure, the steps may additionally include other steps, include the remaining steps except for some steps, or may include additional steps.

The various embodiments of the disclosure are not intended to be exhaustive of all possible combinations and are intended to illustrate representative aspects of the disclosure. The matters described in the various embodiments may be applied independently or in a combination of two or more.

In addition, the embodiments of the present disclosure may be implemented by various means, for example, hardware, firmware, software, or a combination thereof. In a hardware implementation, an embodiment of the present disclosure may be implemented by one or more ASICs (Application Specific Integrated Circuits), digital signal processors (DSPs), digital signal processing devices (DSPDs), programmable logic devices (PLDs), field programmable gate arrays (FPGAs), processors, controllers, microcontrollers, microprocessors, etc.

The scope of the present disclosure includes software or machine-executable instructions (for example, an operating system, applications, firmware, programs, etc.) that enable operations the methods according to the various embodiments to be performed on a device or computer, and a non-transitory computer-readable medium in which such software or instructions are stored and are executable on a device or computer.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A processor implemented method of detecting a roll-off period in an OFDM downstream system, the method comprising:
    generating a temporary roll-off period by applying a windowing function to a signal having a preset length; and
    detecting a roll-off period based on any one of a cross correlation and a sum of differences between a detection target signal included in a range of two OFDM symbol signals based on a detection starting point and the temporary roll-off period.

2. The method of claim 1, wherein the detection target signal is the signal having the preset length and which is selected by moving along a time axis in the two OFDM symbol signals.

3. The method of claim 1, wherein in the detecting of the roll-off period, a position of a detection target signal in which a cross correlation between the detection target signal and the temporary roll-off period becomes maximum is detected as a position of the roll-off period.

4. The method of claim 1, wherein in the detecting of the roll-off period, a position of a detection target signal in which a sum of differences between the detection target signal and the temporary roll-off period becomes minimum is detected as a position of the roll-off period.

5. The method of claim 1, wherein in the generating of the temporary roll-off period, the temporary roll-off period is generated by using a signal included in an OFDM symbol signal before the detection starting point and an OFDM symbol signal after the detection starting point.

6. The method of claim 1, wherein the preset length is any one of 0, 64, 128, 192, and 256.

7. A processor implemented method of detecting a symbol starting point in an OFDM downstream system, the method comprising:
    generating a temporary roll-off period by applying a windowing function to a signal having a preset length;
    detecting a roll-off period based on any one of a cross correlation and a sum of differences between a detection target signal included in a range of two OFDM symbol signals based on a detection starting point, and the temporary roll-off period; and
    detecting an OFDM symbol starting point based on a position of the detected roll-off period.

8. The method of claim 7, wherein in the detecting of the OFDM symbol starting point, the OFDM symbol starting point is detected by using a residual guard period obtained by removing the detected roll-off period from a guard period.

9. A processor implemented method of estimating a fractional frequency offset in an OFDM downstream system, the method comprising:
    generating a temporary roll-off period by applying a windowing function to a signal having a preset length;
    detecting a roll-off period based on any one of a cross correlation and a sum of differences between a detection target signal included in a range of two OFDM symbol signals based on a detection starting point, and the temporary roll-off period; and
    estimating a fractional frequency offset by using a residual guard period obtained by removing the detected roll-off period from a guard period.

10. An OFDM downstream system, comprising:
    a processor; and
    a non-transitory machine-readable storage medium storing machine-readable instructions, executing the instructions by the processor configure the processor to:
    generate a temporary roll-off period by applying a windowing function to a signal having a preset length; and
    detect a roll-off period based on any one of a cross correlation and a sum of differences between a detection target signal included in a range of two OFDM symbol signals based on a detection starting point and the temporary roll-off period.

11. The OFDM downstream system of claim 10, wherein the detection target signal is the signal having the preset length selected by moving along a time axis in the two OFDM symbol signals.

12. The OFDM downstream system of claim 10, wherein the processor configured is to detect as a position of the roll-off period a position of a detection target signal in which a cross correlation between the detection target signal and the temporary roll-off period becomes maximum.

13. The OFDM downstream system of claim 10, wherein the processor is configured to detect as a position of the roll-off period a position of a detection target signal in which a sum of differences between the detection target signal and the temporary roll-off period becomes minimum.

14. The OFDM downstream system of claim 10, wherein the processor is configured to generate the temporary roll-off period by using an OFDM symbol signal before the detection starting point and an OFDM symbol signal after the detection starting point.

15. The OFDM downstream system of claim 10, wherein the preset length may be any one of 0, 64, 128, 192, and 256.

16. The OFDM downstream system of claim 10, wherein the processor is configured to detect an OFDM symbol starting point based on a position of the detected roll-off period.

17. The OFDM downstream system of claim 16, wherein the processor is configured to detect the OFDM symbol starting point by using a residual guard period obtained by removing the detected roll-off period from a guard period.

18. The OFDM downstream system of claim 10, wherein the processor is configured to estimate a fractional frequency offset by using the residual guard period obtained by removing the detected roll-off period from a guard period.

\* \* \* \* \*